June 12, 1928.
F. E. OILER
1,673,120
SHUTTER FOR MOVING PICTURE MACHINES
Filed Jan. 4, 1924    3 Sheets-Sheet 1
Fig. 3
Fig. 1
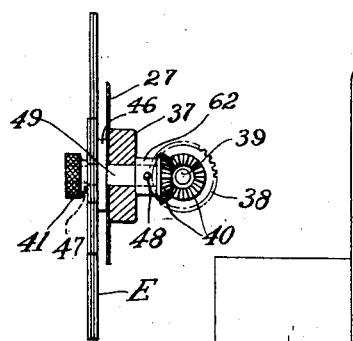
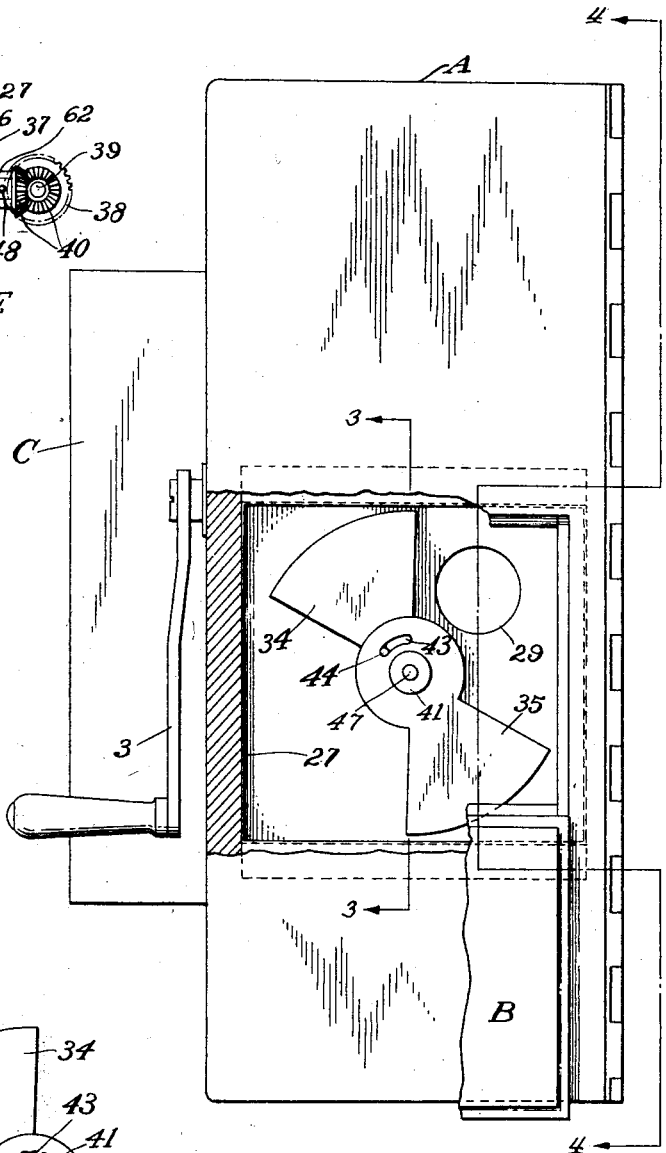
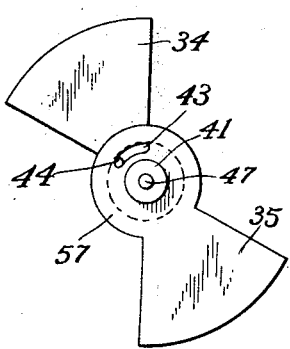
Fig. 2
Inventor
Frank E. Oiler
By Frank D. Gray
Att'y June 12, 1928.

F. E. OILER 1,673,120

SHUTTER FOR MOVING PICTURE MACHINES

Filed Jan. 4, 1924   3 Sheets-Sheet 2

Inventor
Frank E. Oiler

By Frank D. Gray
Att'y

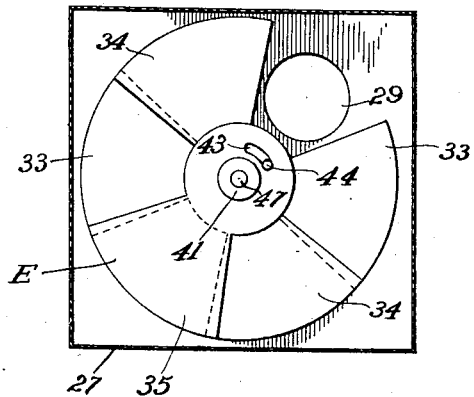
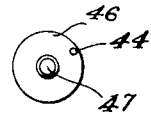
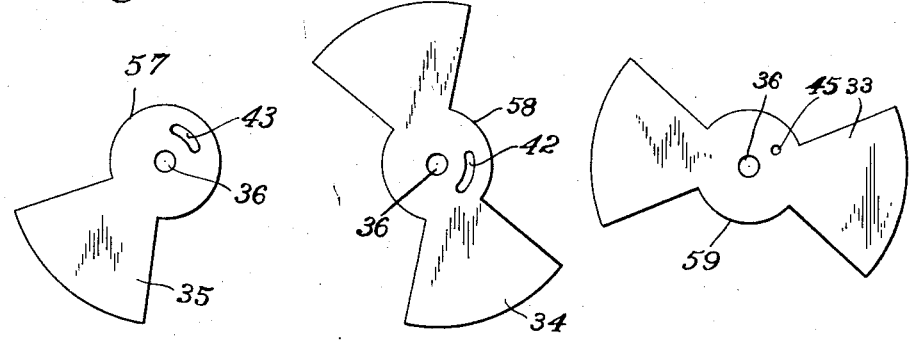

Patented June 12, 1928.

1,673,120

UNITED STATES PATENT OFFICE.

FRANK E. OILER, OF DETROIT, MICHIGAN, ASSIGNOR TO MANTOR, INC., OF NEW YORK, N. Y., A CORPORATION OF DELAWARE.

SHUTTER FOR MOVING-PICTURE MACHINES.

Application filed January 4, 1924, Serial No. 684,339.

This invention relates to motion-picture machines, and especially to structure making possible the combination of a photographic moving picture camera and projecting apparatus, so that substantially the same mechanism may be employed for both purposes.

Among the objects of my invention is the provision of such an apparatus suitable for amateurs, especially for travelers, it being light in weight and easily portable, and yet which will fulfill every essential requirement of the professional operator using the standard size film and the usual lens.

Another object of the improved mechanism is to provide in a combined motion picture camera and projector a new adjustable shutter in which the number and size of light apertures per unit of film travel may be readily and accurately changed by adjustment from the minimum number and minimum size used in photographing animated pictures to the larger number and maximum size used in projecting animated pictures, the said shutter being made of superposed and contiguous blades all of which are moved in unison as the shutter is actuated for either purpose.

A further object of my invention is the combination of a moving picture mechanism adaptable for use with the camera and with the projector, an adjustable shutter, and common driving means for the film and shutter whereby, when the latter is adjusted in one relation, one very short light period followed by a long dark period will elapse during a given shift of the film, and when adjusted in the other relation, two very long light periods interrupted by short dark periods follow in order during such film shift.

With these and other objects in view my invention consists of certain novel features of construction and combination of parts as will be more fully described hereinafter, recited in the appended claims, and illustrated in the accompanying drawings in which:

Figure 1 is a front elevation, portions of the casing being broken away;

Figure 2 is a detail face view of certain of the shutter sectors hinged together;

Figure 3 is an elevation of the shutter and actuating mechanism shown in section taken on the line 3—3 of Fig. 1;

Figure 5 is a front elevation of the shutter mechanism and the casing therefor the latter being shown in section;

Figures 6, 7 and 8 are detailed face views of shutter sectors shown disengaged, and Figure 9 is a face view of a disc carrying the pin for connecting the shutter sectors together.

Figure 4:
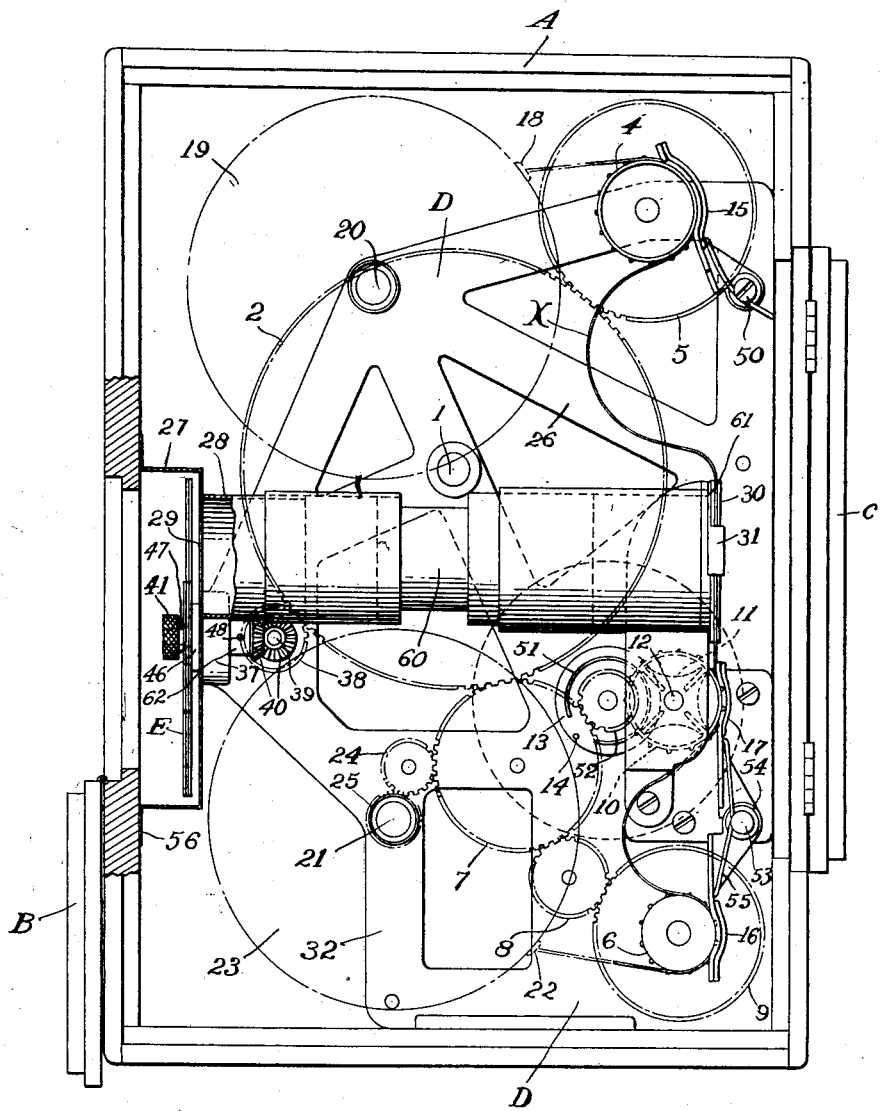
Figure 4 is a part side elevation and part sectional view of my device as taken on the line 4—4 of Fig. 1.

Referring more in detail to the said drawings in which like reference characters refer to like parts throughout the several views, A designates the casing for protecting the entire mechanism, while B and C refer to the front and rear doors of the casing, respectively. The door B swings downward to expose the shutter E while the rear door C swings on vertical hinges to open the rear end of the lens tube with the film adapted to move across the latter, the opening thus permitting light to be directed artificially through the said film and tube from the rear end of the latter for projecting the picture on a screen. D designates a skeleton frame within the case for mounting certain of the various mechanisms for operating the moving parts of the structure.

Between said frame D and the wall of the casing is fixed a main shaft 1 upon which is mounted for rotation a master gear 2, adapted to be actuated by a crank 3 which may be connected to the shaft externally and which includes a detachable hub device permitting the removal of the crank from the external face of the case wall, when it is desired, for the purpose of storage or convenient transportation. Shafts 20 and 21 are mounted on the frame in upper and lower positions, and reels 19 and 23 are mounted on said shafts, respectively. Adjacent the reel 19 a sprocket 4 is mounted on a pivot and integral with a gear 5 in mesh with gear 2. In the lower part of the case is mounted a sprocket 6 upon a pivot and integral with a gear 9 which is driven from gear 2 through the intermediacy of gears 7 and 8. The reel 23 is driven from 7 by means of a gear 25 fixed to the reel and connected to 7 by the intervening gear 24, as shown in Fig. 4.

Adjacent sprocket 4 is a pin 50 on which is hinged a guide and brake element 15 adapted to contact the film X upon the periphery of the sprocket. A similar pin is provided a little above and adjacent sprocket 6 upon which brake 16 is pivoted for contacting 6. Intermediate the sprockets 4 and 6, and just below the rear end of the lens tube 28, is mounted a step-by-step sprocket 10 actuated by the well-known Geneva stop movement which comprises a star wheel 11 mounted on pivot 12, and the balance wheel 13 carrying the sector rim 51, pin 14 and in turn mounted upon and driven by gear 52, as shown in Fig. 4. The gear 52 is in mesh with gear 7, so that the sprocket 10 will be driven intermittently from the driver 2, as will be understood. A brake element 17 is urged against the sprocket 10, and the two brakes 16 and 17 are pivotally mounted upon the same pin 53, though they are urged in opposite directions by springs 54 and 55, respectively.

The film may be unwound from reel 19 and rewound below upon a reel 23, it being guided by the continuously rotating guide sprockets 4 and 6 and intermittently driven guide sprocket 10 in its passage from 19 to 23. If therefore, the crank and gear 2 be driven counter-clock-wise, as they appear in Fig. 4, all said sprockets will be rotated clock-wise, as will also the reels, though the lower reel 23 will be positively driven from the main gear, and is usually enclosed in a casing having a slot 22 near its lower side into which the film is fed; while the upper reel 19 is rotated by unwinding tension exerted upon the film from sprocket 4, the film being guided through the slot 18 in the enclosing casing.

The shutter E is enclosed within a box 27 having flanges 56 suitably secured to the casing wall in registry with the opening formed by dropping the door B. The vertical wall of said box has an aperture 29 adjacent one corner, in registry with which the lens tube 28 extends rearwardly across the camera almost to the door C, the forward end of the tube being fixedly secured to the box 27. A plate 61 is secured to the rear end of the tube at right angles thereto, and is provided with a rectangular aperture of the size of the sight in a standard film and in registry with the tube axis.

Hinged to one edge of and slightly spaced from plate 61 is another plate 30, so that the film X may be guided between the two plates and across the rear end of the tube in its passage from sprocket 4 to sprocket 10, a flanged latch 31 being hinged on 61 and adapted to lock the edges of the two plates together.

My improved adjustable shutter E is mounted for rotation concentrically with a shaft 49 which intersects the wall of the box 27 substantially at its center and parallel with the axis of said tube 28. The shaft 49 has bearings in a reinforce block 37 secured to said casing wall, intersecting both wall and block; a beveled gear 40 being fixed upon the rear end of 49 by means of an enclosing sleeve 62 locked thereon by a pin 48.

Gear 40 is in mesh with a similar gear on a cross shaft 39 driven from gear 2 by a gear 38.

The front end of 49 has secured fixedly and concentrically thereon a thin, disc member 46 provided with a forwardly-extending threaded shaft portion 47 adapted to receive thereon a knurled nut 41 to clamp shutter E thereon detachably and against independent rotation. See Figs. 1 to 5.

For the purpose of providing a unitary shutter which shall be adjustable for affording a single, quite restricted light opening when operating the invention as a camera, and yet readily manipulated to present two sector-shaped openings for use as a projector, each opening being double the size of the one used with the camera, I mount three shutter sections 33, 34 and 35 upon said shaft portion 47. Sections 33 and 34 have double sectors oppositely positioned and integral, each said sector extending over ⅙ of a circumference with intermediate spaces of ⅓ of a circumference. 33 has its sectors connected by a central disc portion 59 which is provided with a small aperture 45 almost in alinement with one edge of a sector. 34 has a central disc portion 58 which is provided with an arc-shaped slot 42 substantially parallel with the disc edge, and section 35 has but one sector of the same size as the other sectors and mounted upon a disc portion 57 having an arc-shaped slot 43 opposite the sector. All three sections have central pivot apertures 36.

These shutter sections are always positioned on shaft 47 in contiguous relation, with a pin 44 projecting from disc member 46 near its periphery, and threaded through aperture 45 and slots 42 and 43, so that all sections may be folded together about 36 to present two light openings each an arc of 120°, with two light-obstructing sectors 60° each. This is the position of the shutter when the invention is used in projecting and is the one shown in Fig. 1 of the drawings in which 34 is superposed upon 33, and 35 is above one of the sectors of 34. By this manner of mounting the shutter sections, they may be expanded in fan-shaped relation as shown in Fig. 5, for use as a camera, in which case a light-obstructing arc of 300° is presented and but one light opening of 60° afforded by each revolution of the shaft.

My shutter, therefore, provides a readily adjustable mechanism requiring no complicated means for effecting the adjustment or locking the parts in adjusted position, the nut 41 serving to adequately lock the sections in desired relation, the sections being fully extended as in Fig. 5 for use as a camera, and completely folded as in Fig. 1, for projecting. The pin 44 and apertures serve to accurately limit the sections in making proper adjustment. I may, therefore, by my novel shutter, provide twice the number of light obstructions when projecting as when taking the pictures on the film to be projected, each of said light openings in the former relation being twice as large as the single opening when taking—a very greatly desired result. Or stating in other terms, the entire light—obstruction sector used when operating as a camera, has an area two and one half times as great as the combined corresponding areas when projecting, though the latter is divided into two obstruction sectors, a further great advantage—since it obviously avoids the objectionable flickering of fewer obstructing areas per rotation of the shaft, the interception of light rays in projecting by my shutter being so frequent as to be almost imperceptible to the eye.

The lens tube 28 is substantially cylindrical and is mounted to extend longitudinally from the shutter box 27 at its forward end to the moving film at its rear end. The particular lens is not disclosed in detail in this case, since it is not claimed, but it is designed to be mounted intermediate the tube ends, at 60 so as to be protected by the latter, the light rays traveling through the shutter and tube toward the film, in using as a camera, and forwardly through the film and tube toward the shutter, in projecting, the same lens being used in either case, but the shutter being adjusted to the modified form, as above explained.

The frame D is composed of integral strips of metal, preferably, designated in the drawings by numerals 26 and 32, the latter frame parts being mounted on the back wall of the casing in spaced relation thereto, so that some parts are mounted between the frame and wall, while others are mounted on said strips on the opposite side from the case wall.

The shutter shaft 49 and gear 52 are, of course, connected with master gear 2 by gears of appropriate size to result in a movement of the film X across the rear end of the tube 28 with a brief stop for each revolution of shaft 49. I am, therefore, able to use my machine as a camera while operating the shutter in its form adjusted to afford a single light opening of a 60° arc, for each rotation of the shutter shaft, and an intervening light obstructing sector of 300°. This results in very clear and distinct pictures on the film, since the light rays for photographing, whether solar rays or of artificial light, are of high intensity.

When using the machine as a projector, the door C is opened, though ordinarily closed when using as a camera, and a source of artificial light is mounted in alinement with the axis of the tube 28 a short distance to the rear of the plate 30 guiding the film. The shutter is now folded into the position shown in Fig. 1 and clamped in that position by screwing down the nut 41, so that at each rotation of the shutter shaft, two light obstructing sectors of 60° each are presented, with two light openings each of 120° arc intervening. The advantage of this arrangement and of this particular shutter will thus be seen to be in the provision of a mechanism for doubling the number of light openings for each shaft revolution when projecting, over that provided when using as a camera, aside from the great advantage of making each of the light openings for projecting, of twice the arc of the single light opening when taking.

It is understood that motion picture machines have been used heretofore which were designed to "take" pictures as well as project the same on a screen, but that the essential change in the shutter for the two purposes was recognized by the use therein of a plurality of shutters, at least one of which was removed when used in one of these method operations. My invention lies in the use of a shutter which is adjustable for both functions in the same machine, as recited in the claims to the combination.

The character of light to be used for projecting is not disclosed, and is regarded as forming no part of the mechanism claimed in this application.

Having now described my invention what I claim as new and desire to secure by Letters Patent is:

1. An adjustable shutter for cameras and projectors comprising two blades each having diametrically opposite sectors each extending over an arc less than a quadrant and a third blade having a single sector of smaller arc than a quadrant, means for mounting the several blades concentrically and contiguously, and means for adjustably fastening them together to form alternatively a single relatively small light opening or two diametrically opposite spaced and relatively large openings.

2. An adjustable shutter for cameras and projectors comprising a plurality of blades two of which have diametrically opposite sectors each extending over an arc of approximately 60°, and a third blade having a single section extending over an arc of approximately 60°, means for mounting the several blades concentrically, and means for adjustably fastening them together to form alternatively a single light opening of approximately 60° or two diametrically spaced openings each of 120°.

3. An adjustable camera and projector shutter comprising a plurality of blades each having oppositely positioned and spaced sectors and a single blade having but one sector, means for mounting all the blades concentrically in superposed and contiguous relation and for common rotation, the blades being rotatably shiftable to assume together the common outline of the blades having spaced opposite sectors or to form a composite sector form by overlapping positions of the sectors, and means for securing detachably together the various blades in the adjusted position.

4. An adjustable shutter comprising concentrically and contiguously mounted blades one of which has one sector-shaped portion and the other blades having each oppositely positioned and spaced sectors, all sectors having equal arcs, adjustment means for securing the blades in relatively rotated position whereby in one of said positions all of the blades may be positioned to conform to the outline area of a double-sector blade, while in another the blades may be rotatably extended into slightly overlapping position whereby but one small sector opening will result and the remaining area will be covered.

5. In shutter mechanism for combined moving picture apparatus, the combination of a shaft, a thin disc member mounted upon and concentrically with the said shaft at one end thereof, said disc member being provided on its front face with a concentric and integral threaded stud shaft, means to rotate the shaft, a plurality of sections mounted upon the stub shaft in superposed and contiguous relation and adjustable circumferentially to provide, selectively, oppositely-positioned light-obstructing sectors with intervening openings of larger size than the obstructing sectors, or a single sector-opening smaller than either of the openings in other relation, with the remaining area wholly closed by over-lapping relation of said sections, a clamping nut for engaging said threaded stub shaft and means for limiting the rotation of said sections relative to the shaft and to each other.

6. In a combined moving picture camera and projector, a casing, film holding and actuating means, and adjustable shutter mechanism comprising two blades each having diametrically opposite sectors each extending over an arc less than a quadrant and a third blade having a single sector of smaller arc than a quadrant, means for mounting the several blades concentrically and contiguously, and means for adjustably fastening them together to provide, selectively, a single sector light opening smaller than a quadrant, with the remaining area wholly closed by over-lapping relation of said blades and thus adapted for camera purposes, or oppositely positioned sectors with intervening openings of larger size than any of said sectors for projecting purposes, rotating means for the shutter mechanism, and means for limiting the rotation of said blades relative to each other.

7. In a combined moving picture camera and projector of the character indicated, the combination of a casing, a lens tube mounted within said casing, means to feed a film across one end of the said tube, a lens being positioned within the latter intermediate its ends, the said film being unobstructed in its position on the end of the tube, a unitary shutter device comprising a plurality of blades each having oppositely positioned and spaced sectors and a single blade having but one sector, mounted for operation across the end of the tube opposite the film, said shutter being rotatably adjustable to present but one light opening by overlapping positions of the sectors for receiving light rays into the tube when taking pictures and a plurality of light openings by forming common outline of spaced opposite sectors for permitting projection of light from the tube, and means to actuate the said shutter.

8. In a combined moving picture camera and projector of the character indicated, the combination of a casing, a lens tube mounted in said casing, means to actuate the film across one end of the tube in unobstructed relation, a unitary shutter device mounted for rotation across the other end of the tube and comprising a plurality of sections clamped together in superposed and contiguous relation coaxially of each other and adjustable circumferentially to provide a continuous light obstruction sector of substantially 300° and a light opening of 60° for use in connection with the operation of the machine as a camera, or to provide a greater number of oppositely-directed light-obstructing sectors with larger intervening sector openings for use with the machine as a projector, and means for releasably locking the blades in shifted position, the sections after adjustments being stationary relative to each other throughout the rotary movement of the shutter.

In testimony whereof I hereunto affix my signature.

FRANK E. OILER.